United States Patent
Kimura (10) Patent No.: US 8,149,944 B2
(45) Date of Patent: Apr. 3, 2012

(54) MIMO COMMUNICATION SYSTEM AND TRANSMISSION STATION

(75) Inventor: Dai Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 670 days.

(21) Appl. No.: 12/273,124

(22) Filed: Nov. 18, 2008

(65) Prior Publication Data

US 2009/0190685 A1 Jul. 30, 2009

(30) Foreign Application Priority Data

Jan. 30, 2008 (JP) ................................. 2008-019641

(51) Int. Cl.
*H04B 7/02* (2006.01)
(52) U.S. Cl. ...................................... 375/267
(58) Field of Classification Search ........................ None
See application file for complete search history.

(56) References Cited

U.S. PATENT DOCUMENTS

| | | | | |
|---|---|---|---|---|
| 6,009,317 A | * | 12/1999 | Wynn | 455/296 |
| 6,150,881 A | * | 11/2000 | Lovelace et al. | 330/252 |
| 2007/0188381 A1 | * | 8/2007 | Bocquet et al. | 342/377 |
| 2008/0049823 A1 | * | 2/2008 | Kang et al. | 375/232 |
| 2009/0074108 A1 | * | 3/2009 | Demir et al. | 375/298 |

FOREIGN PATENT DOCUMENTS

JP 2007-110664 4/2007

OTHER PUBLICATIONS

3GPP TS 36.211 V8.1.0. Technical Specification 3rd Generation Partnership Project; Technical Specification Group Radio Access Network; Evolved Universal Terrestrial Radio Access E-UTRA); Physical Channels and Modulation (Release 8), Nov. 2007.

Motorola, "Comparison of PAR and Cubic Metric for Power Derating" (R1-040642, TSG RAN WG1 #37), May 2004.

* cited by examiner

*Primary Examiner* — David C. Payne
*Assistant Examiner* — Leon-Viet Nguyen
(74) *Attorney, Agent, or Firm* — Murphy & King, P.C.

(57) ABSTRACT

An imbalanced amplitude is produced to a pair of weighing factors ($U_{1,1}$ and $U_{1,2}$, $U_{2,1}$ and $U_{2,2}$) with respect to the transmission streams multiplexed to any of the plurality of transmission antennas. Thus, the increase in PAPR in a preceding MIMO system can be prevented.

20 Claims, 3 Drawing Sheets

MIMO COMMUNICATION SYSTEM AND TRANSMISSION STATION

CROSS-REFERENCE TO RELATED APPLICATION(S)

This application is based upon and claims the benefit of priority of the prior Japanese Application No. 2008-19641 filed on Jan. 30, 2008 in Japan, the entire contents of which are hereby incorporated by reference.

BACKGROUND (1) Field

The embodiment(s) discussed herein is directed to a MIMO communication system and a transmission station. The embodiments are preferable in the case in which, for example, a preceding multi-input multi-output (MIMO) system is applied to an uplink communication in a mobile wireless communication system.

(2) Description of Related Art

A preceding MIMO system has been examined in an long term evolution (LTE) specification examined in 3rd generation partnership project (3GPP) as a third generation mobile wireless communication system. Following Japanese Patent Application Laid-Open No. 2007-110664 described below also describes the preceding MIMO system.

In the precoding MIMO system, predetermined a plurality of sets of preceding matrix (PM) (hereinafter referred to as "code book") are defined. A reception station selects the preceding matrix, by which the most excellent reception property is achieved, by using a known signal (reference signal), and informs this information (index) of the transmission station. The transmission station selects the preceding matrix based on the index informed from the reception station, multiplies the transmission signal by the preceding matrix (the element of the preceding matrix) (as a weighing factor), and transmits the resultant. Thus, the throughput of the wireless communication from the transmission station to the reception station can be enhanced.

In the preceding MIMO system, the optimum number of data pieces (number of streams) simultaneously transmitted from the transmission station to the reception station can be selected. The number of streams may sometimes be referred to as a rank, and the selection of the optimum rank may sometimes be referred to as a rank adaptation.

In the LTE specification (see the following 3GPP TS36.211 V8.1.0 (2007 Dec. 20)), for example, in case where the number of transmission antennas is four, four ranks of 1, 2, 3 and 4 are defined, wherein 16 types (64 types in total) of PM are defined for the corresponding ranks, in relation to the downlink (DL) communication in the direction from a base station to an user equipment (UE).

The UE selects the PM, by which it is estimated that the most excellent reception property is obtained, among 64 types of PMs, and reports this number (index) to the base station. The base station carries out a downlink transmission by using the PM having the reported number.

In case where the number of the transmission antennas is two, 9 types of PMs in total are defined in the LTE specification (see 3GPP TS36.211 V8.1.0 (2007 Dec. 20)). Specifically, the set of PM in the case of the rank 1 is expressed by the following equation (1), and the set of PM in the case of the rank 2 is expressed by the following equation (2), respectively. Notably, $V_{L,M,N}$ represents the Nth PM in the combination (code book) of the PM of L×M matrix, when the number of the transmission antennas is defined as L (L is an integer of 2 or more), and the number of transmission streams (ranks) is defined as M (M is an integer of 1 or more)

$$V_{2,1,0} = \begin{bmatrix} 1 \\ 0 \end{bmatrix}, V_{2,1,1} = \begin{bmatrix} 0 \\ 1 \end{bmatrix}, V_{2,1,2} = \frac{1}{\sqrt{2}}\begin{bmatrix} 1 \\ 1 \end{bmatrix}, \quad \cdots$$

$$V_{2,1,3} = \frac{1}{\sqrt{2}}\begin{bmatrix} 1 \\ -1 \end{bmatrix}, V_{2,1,4} = \frac{1}{\sqrt{2}}\begin{bmatrix} 1 \\ j \end{bmatrix}, V_{2,1,5} = \frac{1}{\sqrt{2}}\begin{bmatrix} 1 \\ -j \end{bmatrix}$$

$$V_{2,2,0} = \frac{1}{\sqrt{2}}\begin{bmatrix} 1 & 0 \\ 0 & 1 \end{bmatrix}, V_{2,2,1} = \frac{1}{2}\begin{bmatrix} 1 & 1 \\ 1 & -1 \end{bmatrix}, V_{2,2,2} = \frac{1}{2}\begin{bmatrix} 1 & 1 \\ j & -j \end{bmatrix} \quad \cdots$$

The 2×2 matrixes in the equation (2) are unitary matrixes, and the 2×1 matrixes in the equation (1) correspond to the extracted column components in each unitary matrix. Since the value by which the total transmission power becomes 1 is multiplied as a normalized coefficient, the 2×1 matrixes are those of constant multiple of the unitary matrixes, to be correct.

Similarly, when the number of the transmission antennas is four, 4×4 matrixes (16 types) in the case of rank 4 are the unitary matrixes, and 4×3 matrixes in the case of rank 3, 4×2 matrixes in the case of rank 2, and 4×1 matrixes in the case of rank 1 respectively correspond to the extracted column components in each unitary matrix. Specifically, the matrixes of PM other than the rank 1 are mutually orthogonal.

In a cellular system, reducing power consumption of UE is important. The enhancement in the power efficiency of an amplifier for a transmission signal of the UE is effective for reducing the power consumption. When the power efficiency of the amplifier is considered from the viewpoint of the transmission signal, it is desirable that the peak to average power ratio (PAPR) of the transmission signal is reduced.

An orthogonal frequency division multiplexing (OFDM) system has been proposed as a wireless access system that is strong for a frequency selective fading in a multi-pass in a broadband radio communication. However, this system employs a multi-carrier transmission, so that the PAPR of the transmission signal tends to increase. From the viewpoint of the power efficiency of the UE, it is unsuitable for the transmission system of the uplink (wireless link from the UE to the base station) in the cellular system.

Therefore, as the transmission system of the uplink (UL) in the LTE specification, a system described below has been proposed. Specifically, in this system, a transmitter adds a cyclic prefix (CP) to an effective symbol in a time-domain to carry out a single carrier transmission, and a receiver performs a frequency equalization. Examples of this system include an single carrier frequency division multiple access (SC-FDMA) system.

In the single carrier transmission, transmission data signals or known signals (reference signal or pilot signal) between the transmission and reception are multiplexed in the time-domain, so that it can suppress the PAPR, compared to the OFDM in which the data signals or known signals are multiplexed in the frequency region.

Since a power added efficiency of an amplifier is enhanced as an output power thereof increases, it is desirable that an operating point is made close to the maximum value of the output power as much as possible. However, when the output power exceeds a fixed threshold value (saturation power), a non-linear distortion, which is non-tolerable as a transmission signal, might occur. Therefore, there is a trade-off relationship between the distortion and the power added efficiency.

Figure 3:
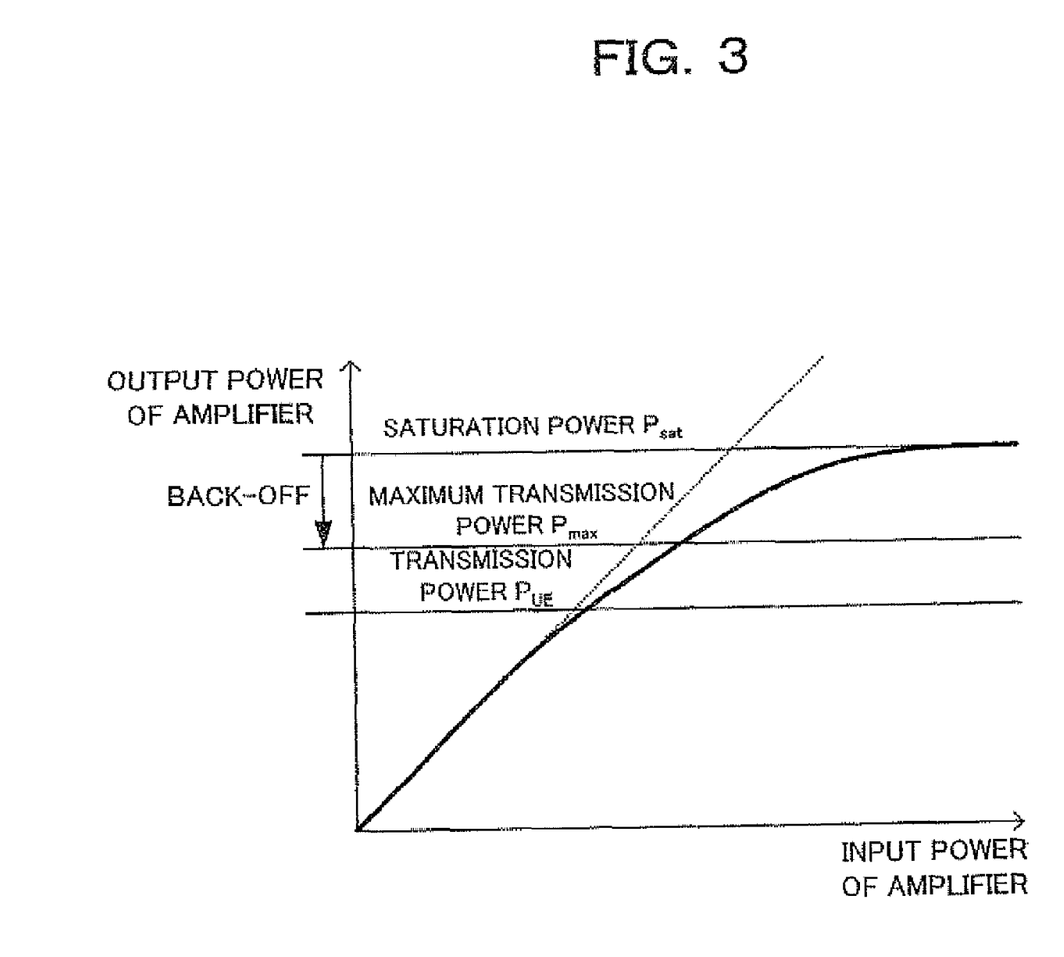
FIG. 3 is a graph illustrating an example of input/output power characteristic of an amplifier used for the UE that is one example of the transmission station.

As the PAPR of the transmission signal is small, the difference (back-off) between the operating point and the threshold value can be decreased (e.g., see FIG. 3). The PAPR is mostly used as an index of evaluating the back-off necessary for the design of the amplifier, but an evaluation index of raw Cubic Metric (raw CM) represented by the following equation (3) is also proposed in the following Motorola, "Comparison of PAR and Cubic Metric for Power De-rating" (R1-040642, TSG RAN WG1 #37), 2004. 5 described below. The relative back-off can be defined by the following equation (4) by using the raw CM.

$$rawCM = 20 * \log 10((v\_norm^3)_{rms})$$

$$CM = [rawCM - 20 * \log 10((v\_norm\_ref^3)_{rms})]/M$$

The value obtained from the equation (4) is referred to as Cubic Metric (CM). This value is close to the actual value compared to the back-off calculated by using the PAPR. In the equations (3) and (4), v_norm represents an amplitude of the normalized input signal, while v_norm_ref represents an amplitude of a signal that becomes a reference. Further, $()_{rms}$ means that the root mean square is assumed, and M is a value determined by the property of the amplifier.

In the existing LTE specification (3GPPTS36.211V8.1.0 (2007 Dec. 20)), the application of the preceding MIMO system is only examined with respect to the downlink (DL) communication (multi-carrier transmission), in which the increase of the PAPR is not a problem, compared to the UE.

SUMMARY

One of the objects of the embodiments are to suppress the increase in the PAPR when the preceding MIMO system is applied to, for example, a single carrier transmission (UL communication in a mobile communication system).

Providing operation and effects that are derived from the configurations, which are illustrated in the preferred embodiments for carrying out the present invention described later, and that cannot be obtained from a prior art can be located as another object of the present invention, in addition to the aforesaid object.

In order to achieve the foregoing object, the present specification describes a following "MIMO communication system and transmission station".

(1) One embodiment of the MIMO communication system disclosed here is a multi-input multi-output (MIMO) communication system including a transmission station that transmits a plurality of transmission streams from a plurality of transmission antennas and a reception station that receives the transmission streams with a plurality of reception antennas and reproduces the respective transmission streams, the MIMO communication system including means for multiplying a weighing factor by the respective received transmission streams, and means for producing an imbalanced amplitude between a pair of the weighing factors with respect to the respective transmission streams multiplexed to any of the transmission antennas.

(2) One embodiment of the transmission station described here is the transmission station in the multi-input multi-output (MIMO) communication system including the transmission station that transmits a plurality of transmission streams with a plurality of transmission antennas and a reception station that receives the transmission streams with a plurality of reception antennas and reproduces the respective received transmission streams, the transmission station including a weighing factor multiplying unit that multiplies a weighing factor by the respective transmission streams, and a control unit operable to produce an imbalanced amplitude to a pair of the weighing factors with respect to the respective transmission streams multiplexed to any of the transmission antennas.

(3) The control unit may set, as the weighing factor, an element of a row to which the imbalanced amplitude is produced between the elements of each row in a unitary matrix constituting a preceding matrix corresponding to the number of the transmission streams.

(4) The control unit may further include a memory that holds a code book including a plurality of sets of the unitary matrix according to the number of the transmission streams, and the unitary matrix that is the subject to be set is selected from the code book.

(5) The imbalanced amplitude may be optimized for the system or every cell formed by the reception station.

(6) The imbalanced amplitude may be optimized based on the characteristic of the amplifier that amplifies the transmission power of the transmission streams.

(7) The control unit may control the imbalanced amplitude in accordance with the transmission power of the transmission station.

(8) The preceding matrix in the case where the number of the transmission antenna is 2 and the number of the transmission stream is 2 may be any one of the matrix obtained by the following equation (6), the matrix obtained by rearranging the rows in the matrix obtained by the equation (6), the matrix obtained by rearranging the columns in the matrix obtained by the equation (6), and the matrix obtained by rearranging the rows and columns in the matrix obtained by the equation (6), wherein α represents the degree of the imbalanced amplitude.

$$U_{2,2}(\alpha, \theta_0, \theta_1, \theta_2) = \frac{\exp(j\theta_0)}{\sqrt{1+\alpha^2}} \begin{bmatrix} \exp(j\theta_1) & \alpha\exp(j\theta_2) \\ -\alpha\exp(-j\theta_2) & \exp(-j\theta_1) \end{bmatrix}$$

(9) The preceding matrix in the case where the number of the transmission antenna is 2N (N is an integer of 2 or more) may be formed by combining, as the matrix element, any one of the 2×2 preceding matrix obtained from the following equation (6), the matrix obtained by rearranging the rows in the matrix obtained by the equation (6), the matrix obtained by rearranging the columns in the matrix obtained by the equation (6), and the matrix obtained by rearranging the rows and columns in the matrix obtained by the equation (6), wherein the degree of the imbalanced is indicated as α.

$$U_{2,2}(\alpha, \theta_0, \theta_1, \theta_2) = \frac{\exp(j\theta_0)}{\sqrt{1+\alpha^2}} \begin{bmatrix} \exp(j\theta_1) & \alpha\exp(j\theta_2) \\ -\alpha\exp(-j\theta_2) & \exp(-j\theta_1) \end{bmatrix}$$

(10) The preceding matrix in the case where the number of the transmission antenna is 4 and the number of the transmission stream is 2 may be any one of the matrix obtained by the following equation (8), the matrix obtained by rearranging the rows in the matrix obtained by the equation (8), the matrix obtained by rearranging the columns in the matrix obtained by the equation (8), and the matrix obtained by rearranging the rows and columns in the matrix obtained by the equation (8), the preceding matrix in the case where the number of the transmission antenna is 4 and the number of the transmission stream is 3 may be any one of the matrix obtained by the following equation (9), the matrix obtained by rearranging the rows in the matrix obtained by the equation (9), the matrix obtained by rearranging the columns in the matrix obtained by the equation (9), and the matrix obtained by rearranging the rows and columns in the matrix obtained by the equation (9), and the preceding matrix in the case where the number of the transmission antenna is 4 and the number of the transmission stream is 4 may be any one of the matrix obtained by the following equation (10), the matrix obtained by rearranging the rows in the matrix obtained by the equation (10), the matrix obtained by rearranging the columns in the matrix obtained by the equation (10), and the matrix obtained by rearranging the rows and columns in the matrix obtained by the equation (10).

$$U_{4,2}(\alpha, \theta^{(1)}, \theta^{(2)}) = \frac{1}{C_N} \begin{bmatrix} U_{2,2}(\alpha, \theta^{(1)}) \\ U_{2,2}(\alpha, \theta^{(2)}) \end{bmatrix} \square \theta = (\theta_0, \theta_1, \theta_2)$$

$$U_{4,3}(\alpha, \theta^{(1)}, \theta^{(2)}) = \frac{1}{C_N} \begin{bmatrix} U_2(\alpha, \theta^{(1)}) & \Delta_{2\times 1} \\ \Delta_{2\times 1} & U_2(\alpha, \theta^{(2)}) \end{bmatrix} \square \theta = (\theta_0, \theta_1, \theta_2)$$

$$U_{4,4}(\alpha, \theta^{(1)}, \theta^{(2)}) = \frac{1}{C_N} \begin{bmatrix} U_2(\alpha, \theta^{(1)}) & \Delta_{2\times 2} \\ \Delta_{2\times 2} & U_2(\alpha, \theta^{(2)}) \end{bmatrix} \square \theta = (\theta_0, \theta_1, \theta_2)$$

wherein $\alpha$ represents the degree of the imbalanced amplitude and $C_N$ represents a normalized coefficient.

According to the disclosed technique, the increase in the PAPR can be suppressed when the preceding MIMO system is applied to the communication in the direction (uplink) from the UE, which is one example of the transmission station, to the base station, which is one example of the reception station.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS(S)

The embodiment will be described with reference to the drawings. The following embodiment is only illustrative, and does not intend to exclude various modifications or application of the technique not described below. Specifically, the embodiments can be embodied as modified in various forms (e.g., by combining the respective embodiments) without departing from the scope of embodiments.

[A] Outline

When a preceding MIMO system is simply applied to a UL communication in order to enhance the throughput of the UL, the transmission signals are multiplexed for every transmission antenna in the case other than the case of the rank 1. As a result, the PAPR (or raw CM) tends to increase. This increase can result in increasing the power consumption of the UE.

In view of this, in order to lessen the increase in the PAPR that is caused by the application of the preceding MIMO system to the UL communication, a unitary matrix U in which the imbalanced amplitude between the components in the rows (between the elements in the columns) is made variable is used for the preceding matrix (PM) that is multiplied by the plurality of transmission streams of the UL. Preferably, the amplitude is made variable depending upon the characteristic of the amplifier or the transmission power of the UE. As illustrated below, the PAPR can be reduced as the imbalanced amplitude is reduced.

For example, the general equation of the 2×2 unitary matrix U2 can be expressed by the following equation (5).

$$U_2 = e^{j\theta} \begin{bmatrix} a & b \\ -b^* & a^* \end{bmatrix}, |a|^2 + |b|^2 = 1$$

When the imbalanced amplitude of $(|b|^2/|a|^2)^{1/2}$ is represented by $\alpha$ as a parameter, the PM in this case can be expressed by the following equation (6).

$$U_{2,2}(\alpha, \theta_0, \theta_1, \theta_2) = \frac{\exp(j\theta_0)}{\sqrt{1+\alpha^2}} \begin{bmatrix} \exp(j\theta_1) & \alpha\exp(j\theta_2) \\ -\alpha\exp(-j\theta_2) & \exp(-j\theta_1) \end{bmatrix}$$

Since $\theta_0$ only produces the same phase rotation to all transmission signals, and does not affect the characteristic, it may be an optional value. Notably, the PM may be the matrix obtained by rearranging the components in the row in the matrix expressed by the equation (6), the matrix obtained by rearranging the components in the column in the matrix expressed by the equation (6), or the matrix obtained by rearranging the components in the column and row in the matrix expressed by the equation (6).

From the equation (6) and the equation (3), the relationship between $\alpha$ and raw CM is as indicated in following Table 1 in theory, for example.

TABLE 1

Relationship between $\alpha$ and raw CM

| | $\alpha$ | | | | |
|---|---|---|---|---|---|
| raw CM [dB] | 0 | 0.25 | 0.5 | 0.75 | 1 |
| QPSK | 3.39 | 3.94 | 4.82 | 5.32 | 5.46 |
| 16QAM | 4.8 | 5.15 | 5.74 | 6.09 | 6.18 |

Specifically, as $\alpha$ is decreased, the raw CM can be decreased. Conceivably, the effect of the preceding MIMO becomes small as $\alpha$ is decreased. For example, in the case of $\alpha=0$, the throughput property corresponding to the case where the preceding MIMO is not carried out is obtained. In the case of $\alpha=1$, the raw CM corresponding to the conventional case (the case in which the preceding MIMO applied to DL is simply applied to UL) is obtained.

In other words, when 2×2 PM defined with respect to the DL communication in the LTE specification is applied to the UL communication, the raw CM increases to 5.46 [dB] with respect to 3.39 [dB] in QPSK in a single stream, while increases to 6.18 [dB] with respect to 4.8 [dB] in 16 QAM.

It is to be noted that the set of PM may be common to the UE in the system, or may differ for a part of or all UEs. In the later case, the UE can autonomously select the preferable or optimum α based on the property of the amplifier of the own station or the current transmission power, and can report the selected α to the base station.

In the cellular system, there may be the case in which the base station controls the transmission power of UE ($P_{UE}$) in such a manner that the transmission power of the UE located at the position close to the cell end (remote from the base station) becomes greater than the transmission power of the UE located at the position close to the center of the cell (close to the base station).

In such a case, the back-off of the UE located at the center of the cell is apparently relatively greater than the back-off of the UE located at the cell end, so that the UE located at the center of the cell can transmit a signal having a greater raw CM (e.g., see FIG. 3).

Specifically, the UE having relatively a great back-off and affording a transmission power can select a greater α. As a result, the throughput of the UL according to the preceding MIMO can be enhanced.

On the other hand, with respect to the UE located in the vicinity of the cell end and not so affording a transmission power, the preceding MIMO is not carried out with α=0. Alternatively, the equation of α=0.25 is established, whereby the throughput according to the preceding MIMO can be enhanced while suppressing the increasing amount of the CM.

The transmission power $P_{UE}$ (the maximum transmission power $P_{max}$) that can be transmitted from the UE without causing the distortion at the amplifier can be expressed by, for example, $P_{UE}(P_{max}) \leq P_{sat} - CM[dB]$, wherein the saturation power of the amplifier is defined as $P_{sat}$, and the value calculated from the equation (4) (back-off) is defined as CM (see FIG. 3). The value of the CM is determined according to the characteristic of the amplifier and the property of the transmission signal. The transmission power $P_{UE}$ of the UE is sometimes controlled from the base station as described above.

Accordingly, the optimum value of α can be defined as the maximum α that satisfies the following equation (7), for example. Notably, the CM(α) means that the CM is the function of α.

$$P_{sat} \geq P_{UE} + CM(\alpha) \qquad (7)$$

Next, the case in which the number of the transmission antenna is greater than 2 is considered. If the transmission signal is multiplexed more than 2 streams per one transmission antenna, the CM might remarkably increase. Therefore, it is preferable to avoid this situation.

When the number of the transmission antenna is 4, and the rank is 2, it is supposed that the PM is formed by the combination of PM in the case where the number of the transmission antenna is 2, which is expressed by the equation (6) described above, as illustrated in the following equation (8). Notably, a CN is a normalized coefficient.

$$U_{4,2}(\alpha, \theta^{(1)}, \theta^{(2)}) = \frac{1}{C_N} \begin{bmatrix} U_{2,2}(\alpha, \theta^{(1)}) \\ U_{2,2}(\alpha, \theta^{(2)}) \end{bmatrix} \Box \theta = (\theta_0, \theta_1, \theta_2) \qquad (8)$$

Similarly, in the case of rank 3 and rank 4, the PM can be formed by the combination of PM in the case where the number of the transmission antenna is 2, as respectively expressed by the following equations (9) and (10).

$$U_{4,3}(\alpha, \theta^{(1)}, \theta^{(2)}) = \frac{1}{C_N} \begin{bmatrix} U_2(\alpha, \theta^{(1)}) & \Delta_{2\times 1} \\ \Delta_{2\times 1} & U_2(\alpha, \theta^{(2)}) \end{bmatrix} \Box \theta = (\theta_0, \theta_1, \theta_2) \qquad (9)$$

$$U_{4,4}(\alpha, \theta^{(1)}, \theta^{(2)}) = \frac{1}{C_N} \begin{bmatrix} U_2(\alpha, \theta^{(1)}) & \Delta_{2\times 2} \\ \Delta_{2\times 2} & U_2(\alpha, \theta^{(2)}) \end{bmatrix} \Box \theta = (\theta_0, \theta_1, \theta_2) \qquad (10)$$

$\Delta_{2\times 1}$ in the equation (9) and $\Delta_{2\times 2}$ in the equation (10) represent the matrix having a coefficient (it may be 0) sufficiently smaller than α, and mean that they have dimensions of 2×1 and 2×2 respectively.

The PM in the case where the number of the transmission antenna is 4 and the rank is 2 may be the matrix obtained by rearranging the components in the row in the matrix obtained from the equation (8), may be the matrix obtained by rearranging the components in the column in the matrix obtained from the equation (8), and may be the matrix obtained by rearranging the components in the row and column in the matrix obtained from the equation (8).

Similarly, the PM in the case where the number of the transmission antenna is 4 and the rank is 3 may be the matrix obtained by rearranging the components in the row in the matrix obtained from the equation (9), may be the matrix obtained by rearranging the components in the column in the matrix obtained from the equation (9), and may be the matrix obtained by rearranging the components in the row and column in the matrix obtained from the equation (9).

The PM in the case where the number of the transmission antenna is 4 and the rank is 4 may be the matrix obtained by rearranging the components in the row in the matrix obtained from the equation (10), may be the matrix obtained by rearranging the components in the column in the matrix obtained from the equation (10), and may be the matrix obtained by rearranging the components in the row and column in the matrix obtained from the equation (10).

The PM having the greater dimension can be formed by the combination of $U_{2,2}(\alpha,\theta)$. In this case, the PM may be the matrix obtained by rearranging the components in the row in the matrix, may be the matrix obtained by rearranging the components in the column in the matrix, and may be the matrix obtained by rearranging the components in the row and column in the matrix.

[B] One Embodiment

Next, a specific example of the MIMO communication system using the unitary matrix, in which the imbalanced amplitude α (variable) is produced between the components of columns of the matrix, to the PM as described above will be described in detail.

Figure 1:
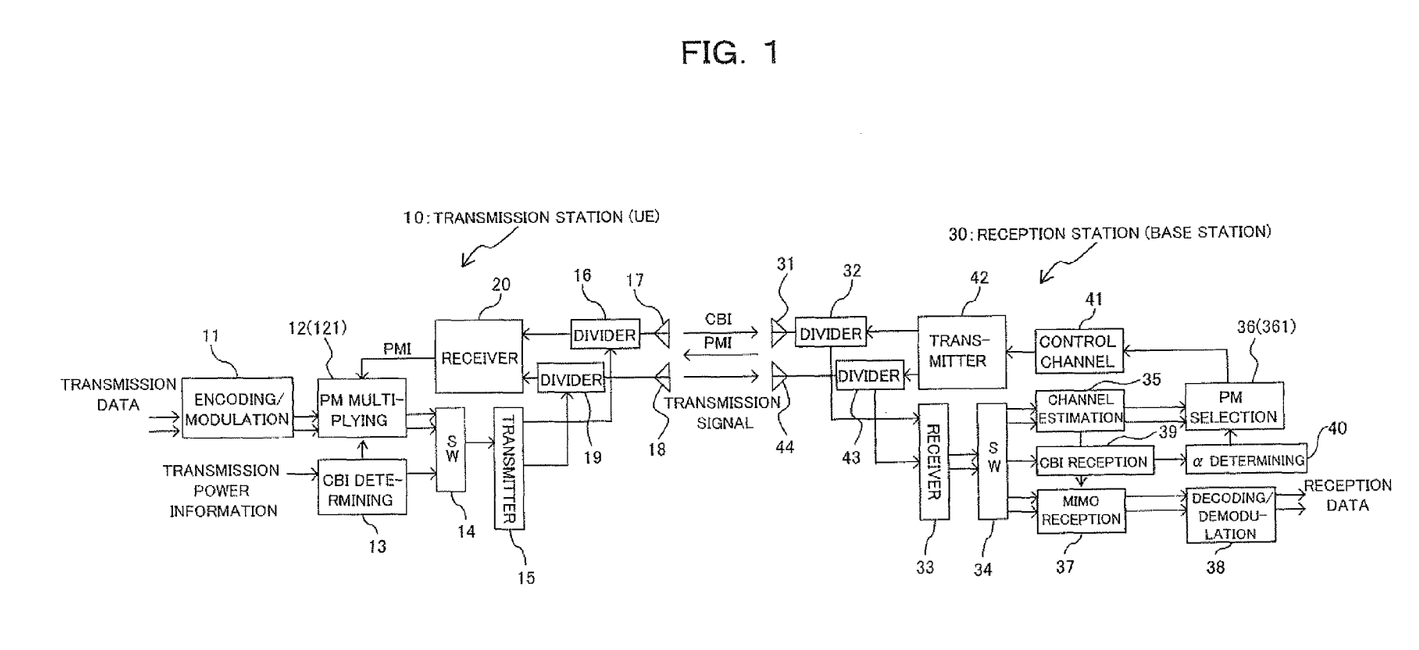
FIG. 1 is a block diagram illustrating an example of a configuration of a MIMO wireless communication system according to an embodiment.

FIG. 1 is a block diagram illustrating an example of a configuration of a MIMO communication system according to an embodiment. The system illustrated in FIG. 1 includes, for example, at least one transmission station 10 and at least one reception station 30. The transmission station 10 is, for example, an UE, and the reception station 30 is, for example, a base station (BS or eNodeB). It is supposed below that a single carrier transmission, which can reduce the PAPR compared to a multicarrier transmission, such as SC-FDMA system is applied for the UL communication, on the assumption of the relationship described above.

(About Transmission Station 10)

As illustrated in FIG. 1, the transmission station 10 includes, for example, an encoding/modulation unit 11, preceding matrix (PM) multiplying unit 12, code book indicator (CBI) determining unit 13, switch (SW) 14, transmitter 15, dividers 16 and 19, a plurality of (2 in this case) antennas 17 and 18, and receiver 20.

The encoding/modulation unit 11 encodes transmitted data with a predetermined encoding system, and modulates the encoded data with a predetermined modulation system. Examples of the encoding system include an error correction encoding such as turbo encoding or convolutional encoding. Examples of the modulation system include a multi-value quadrature modulation system such as QPSK, 16 QAM, 64 QAM, etc. The encoding system and/or modulation system may adaptively be changed (adaptive modulation and coding (AMC) control) according to the environment of propagation path between the reception station 30 and the encoding/modulation unit 11.

The PM multiplying unit 12 has a code book (memory) 121 holding a plurality of sets of preceding matrix (PM). The PM multiplying unit 12 selects the corresponding PM (preceding matrix) from the code book 121 based on the precoding matrix indicator (PMI) reported from the reception station 30, and multiplies the modulation signal sequence obtained from the encoding/modulation unit 11 by the PM (the element of the PM) (as a weighing factor). The PMI is received and extracted (detected) by the receiver 20 as a signal of a control channel, for example.

It is to be noted that the code book 121 in the present embodiment holds sets of PM expressed by the equations (8), (9) and (10), i.e., sets of unitary matrix U in which the imbalanced amplitude α is produced between the elements in each column in the matrix corresponding to the number of the transmission stream.

Figure 2:
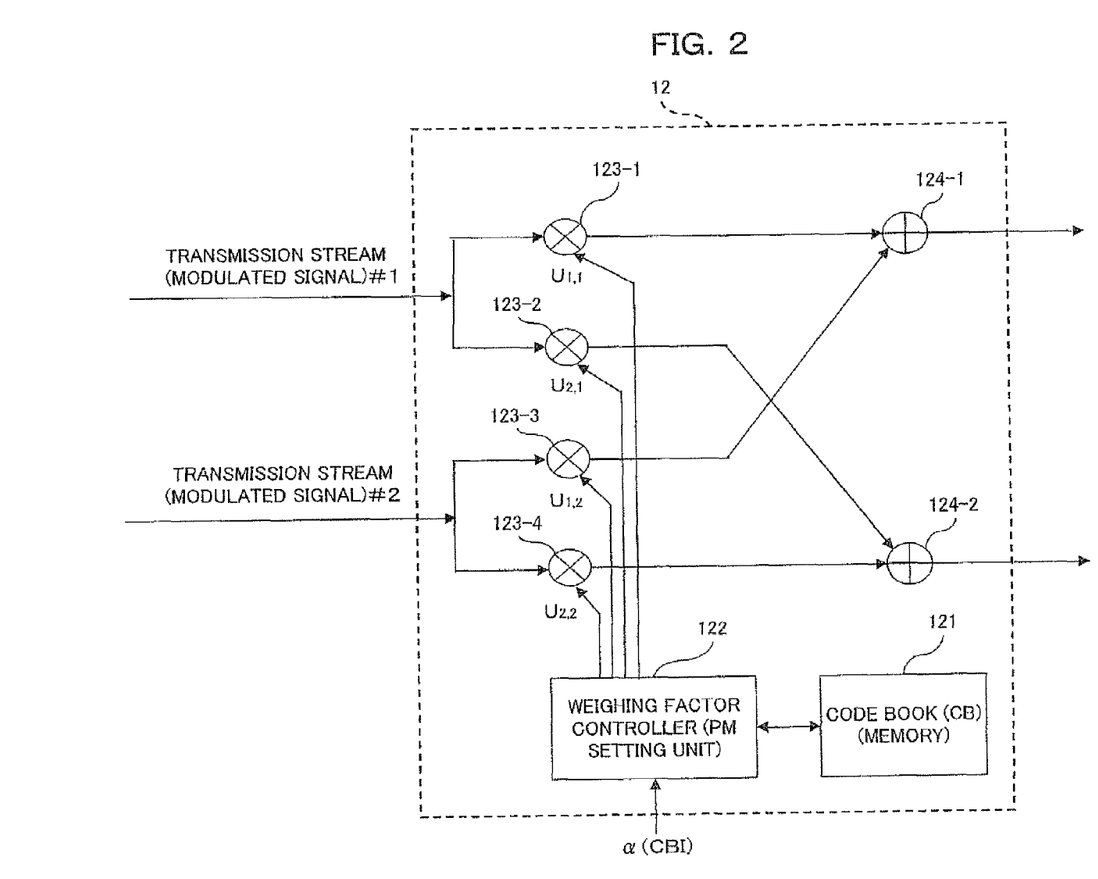
FIG. 2 is a block diagram illustrating an example of a configuration of a PM multiplying unit illustrated in FIG. 1.

Considered here is the case in which the number of the transmission antenna is 2, and the number of the transmission stream is 2. The PM multiplying unit 12 has the code book 121, weighing factor control unit (PM setting unit) 122, multipliers 123-1, 123-2, 123-3, and 123-4, and adders 124-1 and 124-2.

One of the transmission streams is inputted to the multiplier 123-1 and the multiplier 123-2 respectively, wherein the components $U_{1,1}$ and $U_{2,1}$ in the first column (the element having the imbalanced amplitude α) in the preceding matrix (unitary matrix) U selected at the weighing factor control unit 122 are multiplied at the multipliers 123-1 and 123-2 respectively as a weighing factor. The other transmission stream is inputted to the remaining multiplier 123-3 and the multiplier 123-4 respectively, wherein the components $U_{1,2}$ and $U_{2,2}$ in the second column (the element having the imbalanced amplitude α) in the preceding matrix (unitary matrix) U are multiplied at the multipliers 123-3 and 123-4 respectively as a weighing factor.

Subsequently, the result of the multiplication at the multiplier 123-1 and the result of the multiplication at the multiplier 123-2 are added (synthesized) at one adder 124-1, and the result of the multiplication at the remaining multiplier 123-2 and the result of the multiplication of the multiplier 123-4 are added (synthesized) at the other adder 124-2. The respective added results are outputted to the switch 14. One of the results of the addition is distributed to one antenna 17, while the other one is distributed to the other antenna 18.

The CBI determining unit 13 determines (selects) the optimum (or preferable) imbalanced amplitude α. The selected α (or the later-described CBI obtained by quantizing the selected α) is reported to the weighing factor control unit 122 of the PM multiplying unit 12, and reflected on the PM in the code book 121 by the control unit 122.

Specifically, the weighing factor control unit 122 receives the report of the imbalanced amplitude α selected at the CBI determining unit 13, whereby it can produce the imbalanced amplitude α to the set of the weighing factors $U_{1,1}$ and $U_{2,1}$ or the weighing factors $U_{1,2}$ and $U_{2,2}$ for the respective transmission streams multiplexed to any of the antennas 17 and 18.

The α selected by the CBI determining unit 13 may be the value given for every system or every cell of the reception station 30, which is the base station, or the value given based on the characteristic of the amplifier in the transmitter 15 of each of the transmission stations (UE) For example, the maximum α satisfying the equation (7) is selected beforehand, considering the characteristic of the amplifier of the supposed UE 10 or the maximum transmission power, for example.

Alternatively, the UE 10 may autonomously select the maximum α satisfying the equation (7) based on the characteristic of the amplifier, or may adaptively select the maximum α satisfying the equation (7) according to the current transmission power of the UE 10, additionally or alternatively. Specifically, as the current transmission power $P_{UE}$ of the UE 10 is smaller, the back-off (surplus transmission power) is apparently great, so that a greater α, e.g., the maximum α satisfying the equation (7) can be selected. This means that the imbalanced amplitude α can be controlled in accordance with the transmission power of the UE 10.

The α autonomously selected at the UE 10 (the CBI determining unit 13) is preferably reported to the reception station 30 as the signal of the control channel, for example, in order to reflect the α on the code book 361 of the reception station 30. The quantity of the reported information in this case is desirably as smaller as possible from the viewpoint of the saving of the wireless resource (control channel resource) of the UL. Quantizing the α is one example of the techniques for reducing the information quantity. FIG. 1 illustrates that the quantized information (index) is reported to the reception station 30 as the code book indicator (CBI).

The switch 14 selectively outputs the transmission signal, by which the PM is multiplied at the PM multiplying unit 12, and the CBI obtained at the CBI determining unit 13, whereby it outputs the transmission signal and the CBI to the transmitter 15 in a time division multiplexing manner.

The transmitter 15 performs the transmission process, such as DA conversion, frequency conversion (up-convert) to radio frequency, power amplification, etc., to the multiplexed signal, and outputs the resultant to the dividers 16 and 19.

The divider 16 outputs the radio transmission signal inputted from the transmitter 15 to the antenna 17, while outputting the radio reception signal received at the antenna 17 from the reception station 30 to the receiver 20.

Similarly, the divider 19 outputs the radio transmission signal inputted from the transmitter 15 to the antenna 18, while outputting the radio reception signal received at the antenna 18 from the reception station 30 to the receiver 20.

The antennas 17 and 18 are used for both receiving and transmitting signals. They transmit the radio transmission signal from the corresponding dividers 16 and 19 to the reception station 30, while receiving the radio signal transmitted from the reception station 30 and outputting the received radio signal to the corresponding dividers 16 and 19.

The receiver 20 performs a reception process, such as low noise amplification, frequency conversion (down-convert) to the base band frequency, AD conversion, demodulation, decode, etc., to the radio reception signal inputted from the dividers 16 and 19. During the reception process, the PMI received (reported) from the reception station 30 as, for example, the signal of the control channel is extracted and given to the PM multiplying unit 12 as the selection information of the PM in the code book 121.

(About Reception Station 30)

On the other hand, as illustrated in FIG. 1, the reception station 30 includes, for example, a plurality of (2 in this case) antennas 31 and 44, dividers 32 and 43, receiver 33, switch (SW) 34, channel estimating unit 35, PM selecting unit 36, MIMO receiving unit 37, demodulating/decoding unit 38, CBI receiving unit 39, α determining unit 40, control channel transmitting unit 41, and transmitter 42.

The antennas 31 and 44 are used for both receiving and transmitting signals. They transmit the radio transmission signal from the corresponding dividers 32 and 43 to the transmission station 10, while receiving the radio signal transmitted from the transmission station 10 and output the received radio signal to the corresponding dividers 32 and 43.

The divider 32 outputs the radio transmission signal inputted from the transmitter 43 to the antenna 31, while outputting the radio reception signal received by the antenna 31 from the transmission station 10 to the receiver 33.

Similarly, the divider 43 outputs the radio transmission signal inputted from the transmitter 42 to the antenna 44, while outputting the radio reception signal received by the antenna 44 from the transmission station 10 to the receiver 33.

The receiver 33 performs a reception process, such as low noise amplification, frequency conversion (down-convert) to the base band frequency, AD conversion, etc., to the radio reception signal inputted from the dividers 32 and 43.

The switch 34 selectively outputs the reception signal sequence, to which the reception process has already been performed, to any one of the channel estimating unit 35, CBI receiving unit 39, and MIMO receiving unit 37. For example, the known signal (pilot signal or reference signal) with the transmission station 10 is outputted to the channel estimating unit 35, the signal of the control channel that can include the CBI is outputted to the CBI receiving unit 39, and the data signals other than the aforesaid signals are outputted to the MIMO receiving unit 37, respectively.

The channel estimating unit 35 carries out the channel estimation between the transmission station 10 and the channel estimating unit 35 based on the known signal, and gives the obtained value of the channel estimation to the PM selecting unit 36.

The CBI receiving unit 39 detects the CBI from the signal of the control channel, and gives the resultant to the α determining unit 40.

The α determining unit 40 determines (specifies) the α selected by the transmission station 10 (CBI determining unit 13) based on the CBI given from the CBI receiving unit 39, and gives the value thereof to the PM selecting unit 36.

The PM selecting unit 36 has the code book (memory) 361 that holds the same set of PM as the code book 121 used in the transmission station 10. The PM selecting unit 36 reflects the α given from the α determining unit 40 on the PM in the code book 361. Further, it searches (selects) the PM, which is estimated to provide the optimum or preferable reception characteristic [e.g., signal to interference and noise ratio (SINR)], from the code book based on the value of the channel estimation obtained at the channel estimating unit 35, and gives the result (rank, index) to the control channel transmitting unit 41 as the PMI.

For example, when the transmission signal vector is defined as x, the preceding matrix (PM) is defined as Vk (notably, k means an index of PM), the channel matrix is defined as H, and the noise component added to the transmission signal in the propagation path is defined as n, the reception signal vector y is represented by the following equation (11). It is to be noted that Nt represents the number of the transmission antenna, and R indicates the rank of the PM.

$$y = HV_{Nt,R,k} x + n \qquad (11)$$

If the value of the channel estimation obtained at the channel estimating unit 35, i.e., the channel matrix is defined as H, the reception characteristic (SINR)$_{\gamma R,k,j}$ of the jth stream (j=0, 1, ..., R−1) with respect to the kth PM having the rank R can be obtained from the following equation (12), in case where the reception system is minimum mean square error (MMSE).

$$\gamma_{R,k,j} = \frac{1}{\sigma^2 [V^H_{Nt,R,k} H^H H V_{Nt,R,k} + \sigma^2 I_R]^{-1}_{jj}} - 1 \qquad (12)$$

The PM selecting unit 36 obtains a channel capacity $T_{R,k}$ from the following equation (13), for example, based on the value of $\gamma_{R,k,j}$.

$$T_{R,k} = \sum_{j=0}^{R-1} \log_2(\gamma_{R,k,j} + 1) \qquad (13)$$

The control channel transmitting unit 41 transmits the PMI obtained at the PM selecting unit 36 to the transmitter 42 with the PMI included in the signal of the control channel to the transmission station 10.

The transmitter 42 performs a transmission process, such as DA conversion, frequency conversion (up-convert) to the radio frequency, power amplification, etc., to the signal of the control channel, and outputs the resultant to the dividers 32 and 43.

The data signal received by the transmission station 10 is subject to the known preceding MIMO process at the MIMO receiving unit 37 and demodulation/decoding unit 38 so as to reproduce reception data (stream).

(Specific Example of Code Book (PM))

Next, one example of the set of 2×2 PM, which is used in the present embodiment and in which the number of the transmission antenna is 2 and the rank is 2, will be expressed by the following equations (14) to (17).

$$V_{2,2,0} = \frac{1}{\sqrt{2}} U(\alpha, 0, 0, 0) = \frac{1}{\sqrt{2}} \frac{1}{1+\alpha^2} \begin{bmatrix} 1 & \alpha \\ -\alpha & 1 \end{bmatrix} \qquad (14)$$

$$V_{2,2,1} = \frac{1}{\sqrt{2}} U(\alpha, 0, 0, \pi/2) = \frac{1}{\sqrt{2}} \frac{1}{1+\alpha^2} \begin{bmatrix} 1 & j\alpha \\ -j\alpha & 1 \end{bmatrix} \qquad (15)$$

$$V_{2,2,2} = \frac{1}{\sqrt{2}} U(\alpha, \pi/2, \pi/2, 0) = \frac{1}{\sqrt{2}} \frac{1}{1+\alpha^2} \begin{bmatrix} 1 & -j\alpha \\ j\alpha & -1 \end{bmatrix} \qquad (16)$$

$$V_{2,2,3} = \frac{1}{\sqrt{2}} U(\alpha, -\pi/2, \pi/2, \pi/2) = \frac{1}{\sqrt{2}} \frac{1}{1+\alpha^2} \begin{bmatrix} 1 & \alpha \\ -\alpha & -1 \end{bmatrix} \qquad (17)$$

The sets of PM (code book) expressed by the equations (14) to (17) correspond to the results of creating four PMs based on the equation (6), and they are sets of unitary matrix in which the imbalanced amplitude α is produced between the components of each column in the matrix as the set of PM corresponding to the a plurality of transmission streams.

When the number of the transmission antenna is 4, the PM expressed by the following equation (18) in the case of the rank 4, the PM expressed by the following equation (19) in the case of the rank 3, and the PM expressed by the following equation (20) in the case of the rank 2 may respectively be used as one example.

$$V_{4,4,4m+n} = \frac{1}{2} \frac{1}{\sqrt{1+\alpha^2}} \begin{bmatrix} V_{2,2,m} & 0_{2\times 2} \\ 0_{2\times 2} & V_{2,2,n} \end{bmatrix} \quad \quad (19)$$

$$V_{4,3,4m+n} = \frac{1}{\sqrt{3}} \frac{1}{\sqrt{1+\alpha^2}} \begin{bmatrix} V_{2,2,m} & 0_{2\times 1} \\ 0_{2\times 1} & V_{2,2,n} \end{bmatrix} \quad \quad (20)$$

$$V_{4,2,4m+n} = \frac{1}{\sqrt{2}} \frac{1}{\sqrt{1+\alpha^2}} \begin{bmatrix} V_{2,2,m} \\ V_{2,2,n} \end{bmatrix} \quad \quad$$

The equation (18) represents the set of PM obtained based on the equation (10), the equation (19) represents the set of PM obtained based on the equation (9), and the equation (20) represents the set of PM obtained based on the equation (8), respectively.

[C] Others

In the aforesaid embodiment, the transmission station 10 receives the selecting information of PM (PMI) selected by the reception station 30 based on the result of the channel estimation, whereby the PM used in the PM multiplying unit 12 is selected. However, the transmission station 10 may perform a channel estimation based on the reception signal from the reception station 30, and the PM used at the PM multiplying unit 12 may be autonomously selected based on the result (e.g., in case where a time division duplex (TDD)) system may be employed for a two-way communication between the transmission station 10 and the reception station 30).

The aforesaid embodiment assumes that the subject by which the PM, having the imbalanced amplitude α between the elements of the column, is multiplied is the UL transmission stream from the UE 10 to the base station. However, the embodiment does not exclude the case in which the DL transmission stream, whose direction is reverse to the UL transmission stream, is defined as the subject.

As this embodiment may be embodied in several forms without departing from the spirit of essential characteristics thereof, the present embodiments are therefore illustrative and not restrictive, since the scope of the embodiment is defined by the appended claims rather than by the description preceding them, and all changes that fall within metes and bounds of the claims, or equivalence of such metes and bounds thereof are therefore intended to be embraced by the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. A multi-input multi-output (MIMO) communication system including a transmission station that transmits a plurality of transmission streams from a plurality of transmission antennas and a reception station that receives the transmission streams with a plurality of reception antennas and reproduces the respective transmission streams, the MIMO communication system comprising:
multipliers that multiply weighting factors by the respective received transmission streams; and
a controller that produces an imbalanced amplitude between a pair of the weighting factors with respect to the respective transmission streams multiplexed to any of the transmission antennas, wherein
the controller sets, as the weighting factor, a unitary matrix or a submatrix of the unitary matrix in which a number of rows corresponds to a number of the transmission streams and a number of columns corresponds to a number of the transmission antennas.

2. A multi-input multi-output (MIMO) communication system including a transmission station that transmits a plurality of transmission streams from a plurality of transmission antennas and a reception station that receives the transmission streams with a plurality of reception antennas and reproduces the respective transmission streams, the MIMO communication system comprising:
multipliers that multiply weighting factors by the respective received transmission streams; and
a controller that produces an imbalanced amplitude between a pair of the weighting factors with respect to the respective transmission streams multiplexed to any of the transmission antennas, wherein the controller sets, as the weighing factor, an element of a row to which the imbalanced amplitude is produced between the elements of each row in a unitary matrix constituting a precoding matrix corresponding to the number of the transmission streams.

3. The MIMO communication system according to claim 2, wherein the unitary matrix is selected from a code book, comprising a plurality of sets of the unitary matrix according to the number of the transmission streams.

4. The MIMO communication system according to claim 1, wherein the imbalanced amplitude is optimized for the system or every cell formed by the reception station.

5. The MIMO communication system according to claim 1, wherein the imbalanced amplitude is optimized based on a characteristic of an amplifier that amplifies the transmission power of the transmission station.

6. The MIMO communication system according to claim 1, wherein the imbalanced amplitude is controlled in accordance with the transmission power of the transmission station.

7. A multi-input multi-output (MIMO) communication system including a transmission station that transmits a plurality of transmission streams from a plurality of transmission antennas and a reception station that receives the transmission streams with a plurality of reception antennas and reproduces the respective transmission streams, the MIMO communication system comprising:
multipliers that multiply weighting factors by the respective received transmission streams; and
a controller that produces an imbalanced amplitude between a pair of the weighting factors with respect to the respective transmission streams multiplexed to any of the transmission antennas, wherein
the imbalanced amplitude is controlled in accordance with the transmission power of the transmission station, and wherein the imbalanced amplitude is controlled to increase the degree of the imbalance as the transmission power is smaller.

8. A multi-input multi-output (MIMO) communication system including a transmission station that transmits a plurality of transmission streams from a plurality of transmission antennas and a reception station that receives the transmission streams with a plurality of reception antennas and reproduces the respective transmission streams, the MIMO communication system comprising:
> multipliers that multiply weighting factors by the respective received transmission streams; and
> a controller that produces an imbalanced amplitude between a pair of the weighting factors with respect to the respective transmission streams multiplexed to any of the transmission antennas, wherein
> the imbalanced amplitude is optimized based on a characteristic of an amplifier that amplifies the transmission power of the transmission station, and wherein
> the transmission station has a transmitter that reports the imbalanced amplitude to the reception station, and
> the reception station has a controller that produces the imbalanced amplitude reported from the transmission station between the elements in each row in an unitary matrix constituting a precoding matrix included in a code book held by the reception station, the code book comprising a plurality of sets of the unitary matrix corresponding to the number of the transmission streams.

9. A transmission station in a multi-input multi-output (MIMO) communication system including the transmission station that transmits a plurality of transmission streams with a plurality of transmission antennas and a reception station that receives the transmission streams with a plurality of reception antennas and reproduces the respective received transmission streams, the transmission station comprising:
> a weighting factor multiplier that multiplies a weighting factor by the respective transmission streams; and
> a controller operable to produce an imbalanced amplitude to a pair of the weighting factors with respect to the respective transmission streams multiplexed to any of the transmission antennas, wherein
> the controller sets, as the weighting factor, a unitary matrix or a submatrix of the unitary matrix in which a number of rows corresponds to a number of the transmission streams and a number of columns corresponds to a number of the transmission antennas.

10. A transmission station in a multi-input multi-output (MIMO) communication system including the transmission station that transmits a plurality of transmission streams with a plurality of transmission antennas and a reception station that receives the transmission streams with a Plurality of reception antennas and reproduces the respective received transmission streams, the transmission station comprising:
> a weighting factor multiplier that multiplies a weighting factor by the respective transmission streams; and
> a controller operable to produce an imbalanced amplitude to a pair of the weighting factors with respect to the respective transmission streams multiplexed to any of the transmission antennas, wherein the controller sets, as the weighing factor, an element of a row to which the imbalanced amplitude is produced between the elements of each row in a unitary matrix constituting a precoding matrix corresponding to the number of the transmission streams.

11. The transmission station according to claim 10, wherein
> the controller further comprises a memory that holds a code book comprising a plurality of sets of the unitary matrix according to the number of the transmission streams, and
> the unitary matrix that is the subject to be set is selected from the code book.

12. The transmission station according to claim 11, wherein the controller performs the selection based on selecting information relating to the code book reported from the reception station.

13. The transmission station according to claim 9, wherein the imbalanced amplitude is optimized for the system or every cell formed by the reception station.

14. The transmission station according to claim 9, wherein the imbalanced amplitude is optimized based on a characteristic of an amplifier that amplifies the transmission power of the transmission streams.

15. The transmission station according to claim 9, wherein the controller controls the imbalanced amplitude in accordance with the transmission power of the transmission station.

16. A transmission station in a multi-input multi-output (MIMO) communication system including the transmission station that transmits a plurality of transmission streams with a plurality of transmission antennas and a reception station that receives the transmission streams with a Plurality of reception antennas and reproduces the respective received transmission streams, the transmission station comprising:
> a weighting factor multiplier that multiplies a weighting factor by the respective transmission streams; and
> a controller operable to produce an imbalanced amplitude to a pair of the weighting factors with respect to the respective transmission streams multiplexed to any of the transmission antennas, wherein
> the controller controls the imbalanced amplitude in accordance with the transmission power of the transmission station, and wherein the imbalanced amplitude is controlled to increase the degree of the imbalance as the transmission power is smaller.

17. A transmission station in a multi-input multi-output (MIMO) communication system including the transmission station that transmits a plurality of transmission streams with a plurality of transmission antennas and a reception station that receives the transmission streams with a Plurality of reception antennas and reproduces the respective received transmission streams, the transmission station comprising:
> a weighting factor multiplier that multiplies a weighting factor by the respective transmission streams; and
> a controller operable to produce an imbalanced amplitude to a pair of the weighting factors with respect to the respective transmission streams multiplexed to any of the transmission antennas, wherein
> the imbalanced amplitude is optimized based on a characteristic of an amplifier that amplifies the transmission power of the transmission streams, and wherein the controller reports the imbalanced amplitude to the reception station in order to reflect the imbalanced amplitude between the elements of each row in an unitary matrix constituting a precoding matrix included in a code book held by the reception station, the code book comprising a plurality of sets of the unitary matrix corresponding to the number of the transmission streams.

18. The transmission station according to claim 10, wherein the precoding matrix in the case where the number of the transmission antenna is 2 and the number of the transmission stream is 2 is any one of the matrix obtained by the following equation (6), the matrix obtained by rearranging the rows in the matrix obtained by the equation (6), the matrix obtained by rearranging the columns in the matrix obtained by the equation (6), and the matrix obtained by rearranging the rows and columns in the matrix obtained by the equation (6), wherein α represents the degree of the imbalanced amplitude.

$$U_{2,2}(\alpha, \theta_0, \theta_1, \theta_2) = \frac{\exp(j\theta_0)}{\sqrt{1+\alpha^2}} \begin{bmatrix} \exp(j\theta_1) & \alpha\exp(j\theta_2) \\ -\alpha\exp(-j\theta_2) & \exp(-j\theta_1) \end{bmatrix} \quad (6)$$

19. The transmission station according to claim 10, wherein the precoding matrix in the case where the number of the transmission antenna is 2N (N is an integer of 2 or more) is formed by combining, as the matrix element, any one of the 2×2 precoding matrix obtained from the following equation (6), the matrix obtained by rearranging the rows in the matrix obtained by the equation (6), the matrix obtained by rearranging the columns in the matrix obtained by the equation (6), and the matrix obtained by rearranging the rows and columns in the matrix obtained by the equation (6), wherein the degree of the imbalanced is indicated as α.

$$U_{2,2}(\alpha, \theta_0, \theta_1, \theta_2) = \frac{\exp(j\theta_0)}{\sqrt{1+\alpha^2}} \begin{bmatrix} \exp(j\theta_1) & \alpha\exp(j\theta_2) \\ -\alpha\exp(-j\theta_2) & \exp(-j\theta_1) \end{bmatrix} \quad (6)$$

20. The transmission station according to claim 10, wherein the precoding matrix in the case where the number of the transmission antenna is 4 and the number of the transmission stream is 2 is any one of the matrix obtained by the following equation (8), the matrix obtained by rearranging the rows in the matrix obtained by the equation (8), the matrix obtained by rearranging the columns in the matrix obtained by the equation (8), and the matrix obtained by rearranging the rows and columns in the matrix obtained by the equation (8), the precoding matrix in the case where the number of the transmission antenna is 4 and the number of the transmission stream is 3 is any one of the matrix obtained by the following equation (9), the matrix obtained by rearranging the rows in the matrix obtained by the equation (9), the matrix obtained by rearranging the columns in the matrix obtained by the equation (9), and the matrix obtained by rearranging the rows and columns in the matrix obtained by the equation (9), and the precoding matrix in the case where the number of the transmission antenna is 4 and the number of the transmission stream is 4 is any one of the matrix obtained by the following equation (10), the matrix obtained by rearranging the rows in the matrix obtained by the equation (10), the matrix obtained by rearranging the columns in the matrix obtained by the equation (10), and the matrix obtained by rearranging the rows and columns in the matrix obtained by the equation (10), $$U_{4,2}(\alpha, \theta^{(1)}, \theta^{(2)}) = \frac{1}{C_N} \begin{bmatrix} U_{2,2}(\alpha, \theta^{(1)}) \\ U_{2,2}(\alpha, \theta^{(2)}) \end{bmatrix} \square \theta = (\theta_0, \theta_1, \theta_2) \quad (8)$$

$$U_{4,3}(\alpha, \theta^{(1)}, \theta^{(2)}) = \frac{1}{C_N} \begin{bmatrix} U_2(\alpha, \theta^{(1)}) & \Delta_{2\times 1} \\ \Delta_{2\times 1} & U_2(\alpha, \theta^{(2)}) \end{bmatrix} \square \theta = (\theta_0, \theta_1, \theta_2) \quad (9)$$

$$U_{4,4}(\alpha, \theta^{(1)}, \theta^{(2)}) = \frac{1}{C_N} \begin{bmatrix} U_2(\alpha, \theta^{(1)}) & \Delta_{2\times 2} \\ \Delta_{2\times 2} & U_2(\alpha, \theta^{(2)}) \end{bmatrix} \square \theta = (\theta_0, \theta_1, \theta_2) \quad (10)$$

wherein α represents the degree of the imbalanced amplitude and $C_N$ represents a normalized coefficient.

* * * * *